(12) United States Patent
Inui et al.

(10) Patent No.: US 8,448,740 B2
(45) Date of Patent: May 28, 2013

(54) TRANSMISSION MECHANISM PERMITTING BOTH AUTOMATIC AND MANUAL TRANSMISSION GEAR CHANGE

(75) Inventors: Hiroatsu Inui, Saitama (JP); Dai Arai, Saitama (JP); Kenji Matsuo, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 1501 days.

(21) Appl. No.: 11/804,057

(22) Filed: May 16, 2007

(65) Prior Publication Data

US 2007/0267240 A1 Nov. 22, 2007

(30) Foreign Application Priority Data

May 18, 2006 (JP) ................................. 2006-138387

(51) Int. Cl.
*F16H 35/08* (2006.01)
(52) U.S. Cl.
USPC ............................................ 180/292; 74/335
(58) Field of Classification Search
USPC ..................................... 180/291, 292; 74/335
See application file for complete search history.

(56) References Cited

U.S. PATENT DOCUMENTS

| | | | | |
|---|---|---|---|---|
| 5,992,254 A | * | 11/1999 | Machado | 74/335 |
| 6,085,607 A | * | 7/2000 | Narita et al. | 74/335 |
| 6,453,762 B1 | * | 9/2002 | Nishikawa et al. | 74/335 |
| 2001/0023619 A1 | * | 9/2001 | Ota et al. | 74/335 |
| 2005/0087032 A1 | * | 4/2005 | Kawakubo et al. | 74/473.1 |

FOREIGN PATENT DOCUMENTS

| | | |
|---|---|---|
| CA | 2417066 | 3/1999 |
| DE | 19838146 | 3/1999 |
| EP | 1132661 | 9/2001 |
| JP | 11-082734 | 3/1999 |

* cited by examiner

*Primary Examiner* — J. Allen Shriver, II
*Assistant Examiner* — Erez Gurari
(74) *Attorney, Agent, or Firm* — Carrier Blackman & Associates, P.C.; William D. Blackman; Joseph P. Carrier

(57) ABSTRACT

A transmission driving mechanism of a transmission in an internal combustion engine is provided in which where a separate transmission driving mechanism for manual operation is not required in addition to an automatic transmission driving mechanism, whereby the number of parts is reduced, the structure is simple, no maintenance is required and the cost is reduced. The transmission transmits the rotation of a crankshaft to an output shaft at a modified speed, and includes a transmission driving mechanism which rotates a shift spindle using a shift actuator in order to automatically shift gears within the transmission and change the outputted speed of the engine. One end of the shift spindle extends through an engine case cover, and protrudes outside, and a turning tool is fitted onto a fitting portion formed at the protruding end of the shift spindle, whereby manual shifting of the transmission gears can also be achieved.

14 Claims, 7 Drawing Sheets

TRANSMISSION MECHANISM PERMITTING BOTH AUTOMATIC AND MANUAL TRANSMISSION GEAR CHANGE

CROSS-REFERENCE TO RELATED APPLICATIONS

The present invention claims priority under 35 USC 119 based on Japanese patent application No. 2606-138387, filed on May 18, 2006. The subject matter of this priority document is incorporated by reference herein.

BACKGROUND OF THE INVENTION

1. Field of the Invention

The present invention relates to an internal combustion engine provided with a transmission which includes a transmission driving mechanism that shifts gears within the transmission to achieve a change in engine output speed, the transmission driving mechanism accomplishing shifting of gears within the transmission using an electric motor.

2. Description of the Background Art

It is known in the art to provide an internal combustion engine having a transmission with a transmission driving mechanism that executes the shift of the transmission gears. The known transmission driving mechanism achieves engine output speed change by shifting gears within the transmission using an electric motor. Such an internal combustion engine is disclosed, for example, in JP-A No. H11-82734.

The internal combustion engine disclosed in JP-A No. H11-82734 is mounted in an all terrain vehicle with a crankshaft directed in a longitudinal direction of the vehicle. In the corresponding transmission driving mechanism, the drive of an electric shift motor protruding from the front of a crankcase is transmitted to the turning of a shift spindle via a speed reducing device, the turning of the shift spindle turns a shift drum, moves a shift fork, the engagement of speed change gears in the transmission is changed, and a shift is executed.

A turning angle sensing device is attached to a front end of the shift spindle, the base of an arm is fitted onto its rear end, and an arm of a secondary spindle which is directed in a lateral horizontal direction perpendicular to the crankshaft and the left end of which is protruded on the side of the internal combustion engine is fitted to the end of the arm.

A hexagonal part is formed at the protruded left end of the secondary spindle, and the secondary spindle is turned by fitting a wrench onto the hexagonal part and rocking the hexagonal part. As a result, the shift spindle is manually turned via a fitting part of the aim, and the arrangement of speed change gears within the transmission can be shifted to achieve speed change. That is, the known transmission driving mechanism depends upon the secondary spindle to enable manual operation of the transmission using a tool such as a wrench when a shift by the electric shift motor is not performed.

As described above, in the transmission driving mechanism disclosed in JP-A No. H11-82734, since the transmission driving mechanism dedicated to manual operation using the secondary spindle is provided separately from the execution of a shift by the electric shift motor via the shift spindle, a large number of parts are required, the engine and transmission structure is intricate, the assembly thereof is troublesome, maintenance is required, and the cost is increased.

The present invention is made in view of the above described problems, and the object is to provide a transmission driving mechanism of an internal combustion engine in which a separate transmission driving mechanism for manual operation is not required, the number of parts is reduced, the structure is simple, no maintenance is required and the cost is reduced.

SUMMARY

In order to achieve the above-mentioned object, according to a first aspect of the invention, a transmission of an internal combustion engine that transmits the rotation of a crankshaft to an output shaft at a modified speed includes a transmission driving mechanism. The transmission driving mechanism rotates a shift spindle using a shift actuator, whereby shifting of transmission gears is automatically achieved, and engine output speed change is obtained, wherein one end of the shift spindle pierces an engine case cover and protrudes outside thereof, and a fitting part onto which a turning tool is fitted is formed at the protruding end of the shift spindle.

A second aspect of the invention includes the transmission driving mechanism of the internal combustion engine according to the first aspect of the invention, and further includes the internal combustion engine mounted in a vehicle with the crankshaft directed in a longitudinal direction of the body. In the transmission driving mechanism, the fitting part is formed at a forward facing end of the shift spindle, and the shift spindle is arranged in parallel to the crankshaft and directed in the longitudinal direction of the body. The fitting part is operated using a turning tool, such that a part of the turning tool is fitted onto the fitting part at the front end of the shift spindle, and the tool handle is turned along the front of the engine case cover.

A third aspect of the invention includes the transmission driving mechanism of the internal combustion engine according to the second aspect of the invention, and further includes a turning angle sensing device that is provided on a rear end of the shift spindle. In addition, accessories of the internal combustion engine, including a shaft rotation counting sensor, an engine speed sensor, shift position sensor, and an AC generator terminal are arranged mainly in the rear of the body of the internal combustion engine.

A fourth aspect of the invention includes the transmission driving mechanism of the internal combustion engine according to either the second or third aspects of the invention, and further includes the shift spindle arranged below a staring clutch provided on a front end of the crankshaft. The shift actuator which actuates the shift spindle to achieve gear change protrudes forward in a lower part of the engine case cover which covers the front of the starting clutch, and a turning range of the turning tool overlaps with the setting clutch on the side of the actuator of the engine case cover in a front view.

A fifth aspect of the invention includes the transmission driving mechanism of the internal combustion engine according to the fourth aspect of the invention, and further includes a plane extending through the central axis of the stating clutch and the central axis of the shift spindle. The shift actuator is arranged on the transmission on one side of the plane, and a shift clutch is arranged on the other side of the plane so that the shift clutch partially overlaps with the starting clutch at the rear side of the starting clutch in the front view. The engine case cover also covers the front of the shift clutch together with the front of the starting clutch, and the turning range of the turning tool overlaps with the shift clutch in the front view.

A sixth aspect of the invention includes the transmission driving mechanism of the internal combustion engine according to either the fourth or fifth aspect of the invention, and further includes the shift spindle arranged next to a lower edge of the engine case cover.

According to the first aspect of the invention, one end of the shift spindle pierces the engine case cover, protrudes outside, and the fitting part onto which the turning tool is fitted is formed at the protruding end of the shift spindle. As a result, the shift spindle is capable of being manually turned and a gear shift operation can be performed by fitting the turning tool onto the fitting part at the end of the shift spindle which protrudes from the engine case cover. In this arrangement, a specific or separate transmission driving mechanism for manual shift operation is not required, the number of parts is reduced, the structure is simple and is excellent in the ease of assembly, and the cost is reduced.

According to the second aspect of the invention, the internal combustion engine is mounted in the vehicle with the crankshaft directed in the longitudinal direction of the body. The fitting part is formed at the front end of the shift spindle, which is arranged in parallel to the crankshaft and directed in the longitudinal direction of the vehicle body. The turning tool is fitted onto the fitting part at the front end of the shift spindle and is turned along the front of the engine case cover. As a result, the turning tool is operated in front of the body of the internal combustion engine, the turning range traversed by the turning tool is easily secured, and work is also easy.

According to the third aspect of the invention, the turning angle sensing device is provided on the rear end of the shift spindle, and accessories of the internal combustion engine are arranged mainly in the rear of the body of the internal combustion engine. As a result, the turning range of the turning tool is easily secured in font of the internal combustion engine. In addition, since the accessories are concentrated on the rear of the internal combustion engine, wiring is facilitated and the accessories can be protected from scared stones or other impacts.

According to the fourth aspect of the invention, the shift spindle is arranged below the starting clutch which is provided on the front end of the crankshaft, and the shift actuator protrudes forward in the lower part of the engine case cover which covers the front of the starting clutch. As a result, the shift actuator and the shift spindle are located mutually close and motive power can be easily and smoothly transmitted. In addition, since the turning range of the turning tool overlaps with the stating clutch on the side of the shift actuator of the engine case cover in the front view, sufficient turning range for turning of the turning tool is easily secured without interfering with the shift actuator.

According to the fifth aspect of the invention, the shift actuator is arranged on one side of a plane which includes the central axis of the starting clutch and the central axis of the shift spindle, and the shift clutch is arranged on the other side of the plane so that the shift clutch partially overlaps with the starting clutch, and is disposed rearward of the starting clutch, as seen in the front view. The engine case cover also covers the front of the shift clutch together with the front of the starting clutch. As a result, the turning range of the turning tool overlaps with the shift clutch in the front view, large space in front of the starting clutch and the shift clutch respectively having a large diameter is used for the turning range of the turning tool, the turning tool is large-sized, and the operability of the manual shift operation is enhanced.

According to the sixth aspect of the invention, the shift spindle is arranged next to the lower edge of the engine case cover. As a result, the operating part of the turning tool is fitted onto the fitting part of the shift spindle at a location near the lower edge of the engine case cover, and the tool handle extends long in an upward direction therefrom, whereby the operability is further enhanced.

Modes for carrying out the present invention are explained below by reference to an embodiment of the present invention shown in the attached drawings. The above-mentioned object, other objects, characteristics and advantages of the present invention will become apparent form the detailed description of the embodiment of the invention presented below in conjunction with the attached drawings.

DETAILED DESCRIPTION

Figure 1:
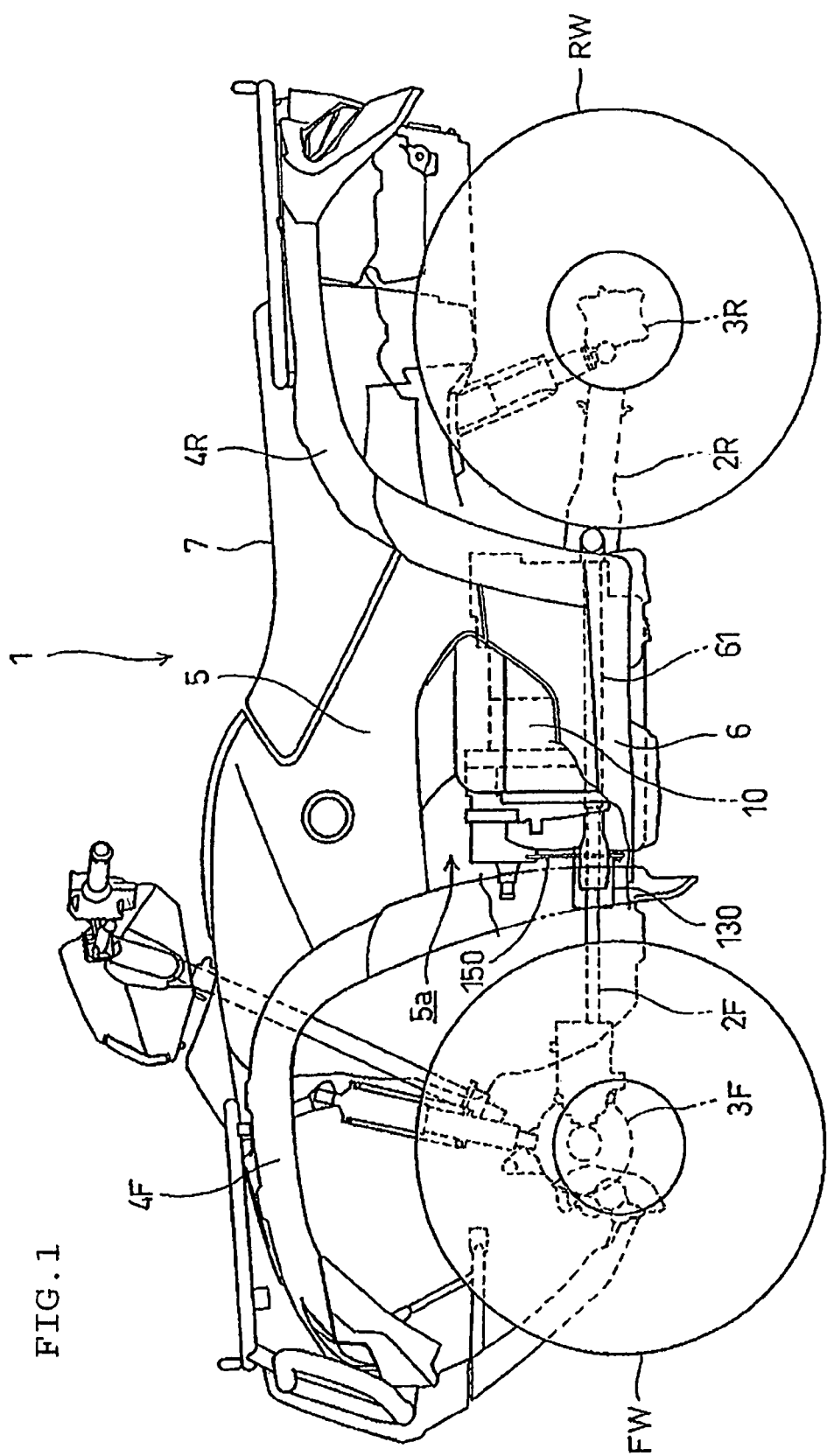
FIG. 1 is a side view of an all terrain vehicle on which is mounted an internal combustion engine including a transmission according to one embodiment of the invention.

A selected illustrative embodiment of the invention will now be described in some detail, with reference to the drawings. It should be understood that only structures considered necessary for clarifying the present invention are described herein. Other conventional structures, and those of ancillary and auxiliary components of the system, are assumed to be known and understood by those skilled in the art. An internal combustion engine 10 equivalent to this embodiment is a water-cooled single-cylinder 4-stroke cycle internal combustion engine and is vertically mounted in an all terrain vehicle 1 with a longitudinally directed crankshaft 11. The all terrain vehicle 1 is a saddle-ride type four-wheel vehicle, and a pair of right and left front wheels FW and a pair of right and left rear wheels RW, each respectively including a low pressure balloon tire for rough terrain, are suspended in a longitudinal direction of a body flame 2. Herein, and throughout the description of the invention, the front, the rear, the right and the left are determined with respect to the direction of forward travel of the vehicle.

The internal combustion engine 10 is mounted between the front wheel FW and the rear wheel RW, and an output shaft 61 is longitudinally protruded from a transmission 40 located on the left side of the internal combustion engine 10. The rotational motive power of the output shaft 61 is transmitted to the right and left front wheels FW from a front end of the output shaft 61 via a front drive shaft 2F and a front final reduction gear unit 3F, and the rotational motive power is transmitted to the right and left rear wheels RW from a rear end of the output shaft via a rear drive shaft 2R and a rear final reduction gear unit 3R.

A front fender 4F covers the front wheel FW from above the front wheel and toward the rear side thereof, and a rear fender 4R covers the rear wheel RW from above the rear wheel. A side cover 5 covers the right side and the left side of the internal combustion engine 10 mounted between the front wheel FW and the rear wheel RW, a step plate 6 protrudes outside from a lower edge of the side cover, and the step plate 6 is laid between the front fender 4F and the rear fender 4R.

A seat 7 is provided between the right and the left rear fenders 4R, 4R.

The front of the side cover 5 is truncated whereby access opening 5a is formed. The access opening 5a reaches a rear face of the front fender 4F, and is located in a position in which the front of the internal combustion engine 10 is revealed.

Figure 2:
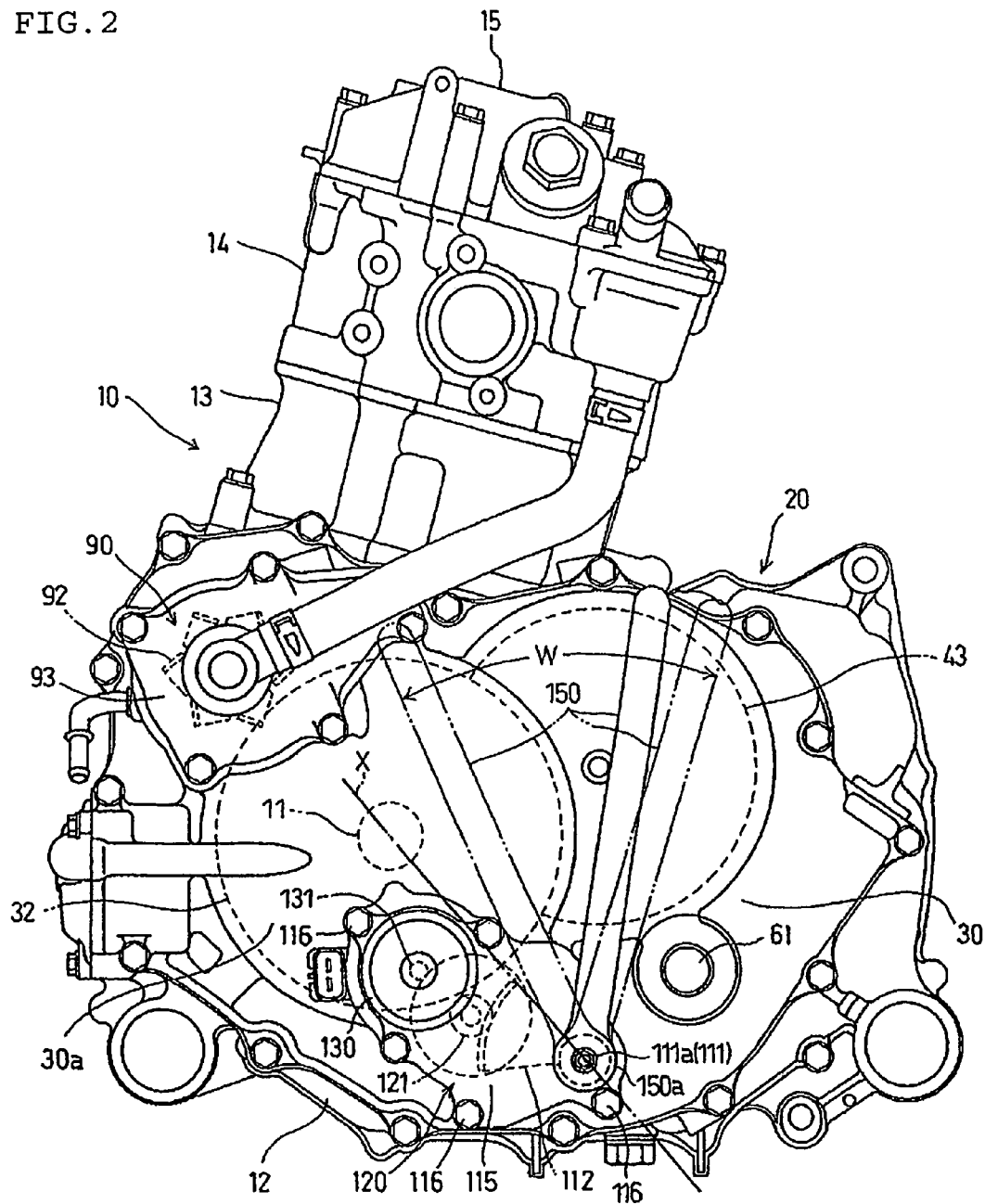
FIG. 2 is a front view of the internal combustion engine of FIG. 1, showing a tool engaged with a fitting part formed on a front end of a shift spindle, and also shows the turning range W of the tool.
Figure 3:
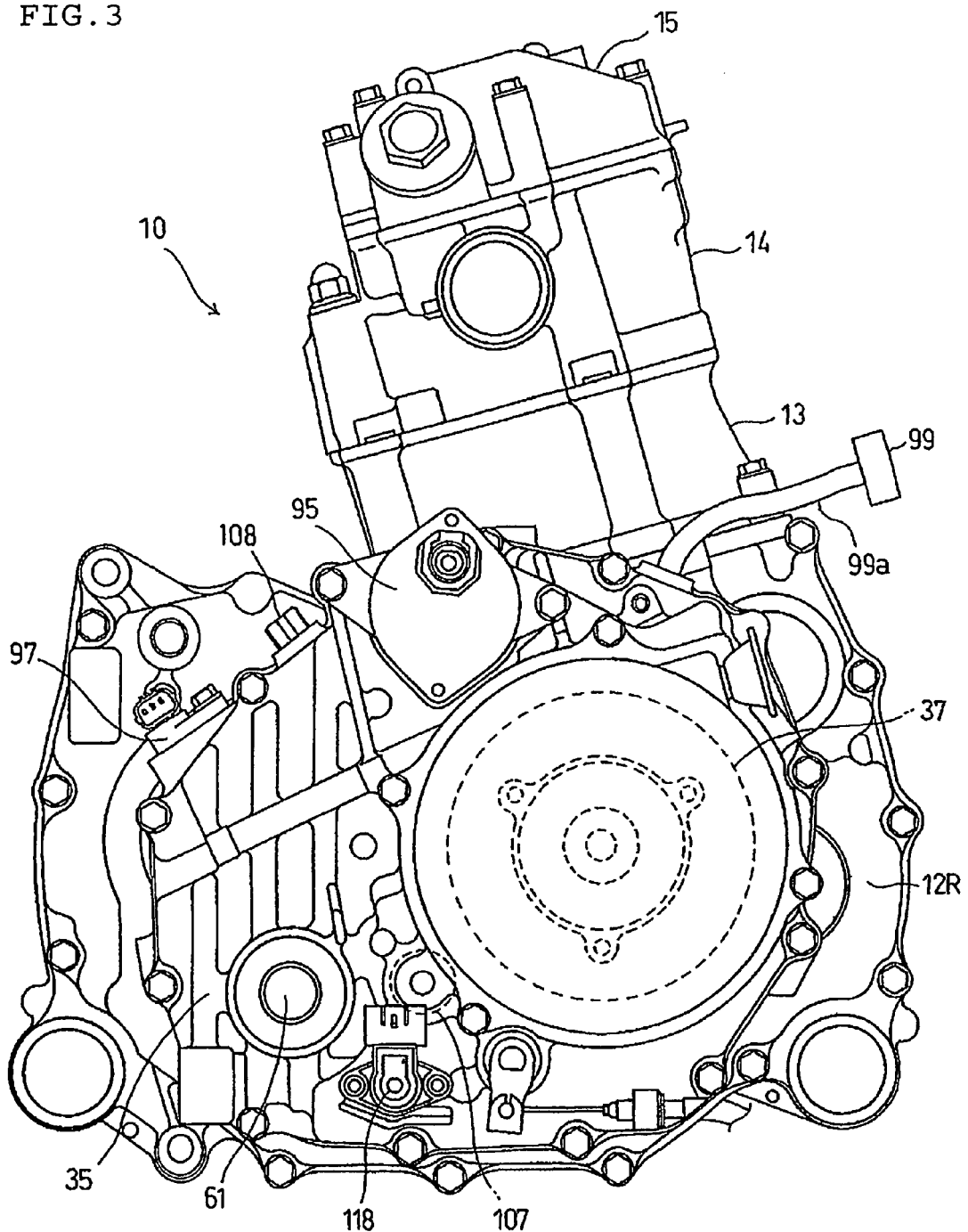
FIG. 3 is a rear view of the internal combustion engine of FIG. 1, showing appliances, sensors, and connectors mounted on rear side of the internal combustion engine.

As shown in FIGS. 2 and 3, which respectively correspond to a front view and rear view of the internal combustion engine 10, the internal combustion engine 10 is planted in a state in which a cylinder block 13, a cylinder head 14 and a cylinder head cover 15 are sequentially piled on a crankcase 12 and are slightly inclined leftward (rightward in FIG. 2) with respect to the direction of forward travel of the vehicle.

The crankcase 12 also houses the transmission 40 arranged on the left side of the crankshaft 11 inside. The crankcase 12 has longitudinal structure configured by a front crankcase half 12F and a rear crankcase half 12R respectively divided longitudinally by a plane perpendicular to the crankshaft 11 directed in a longitudinal direction of the body.

Figure 4:
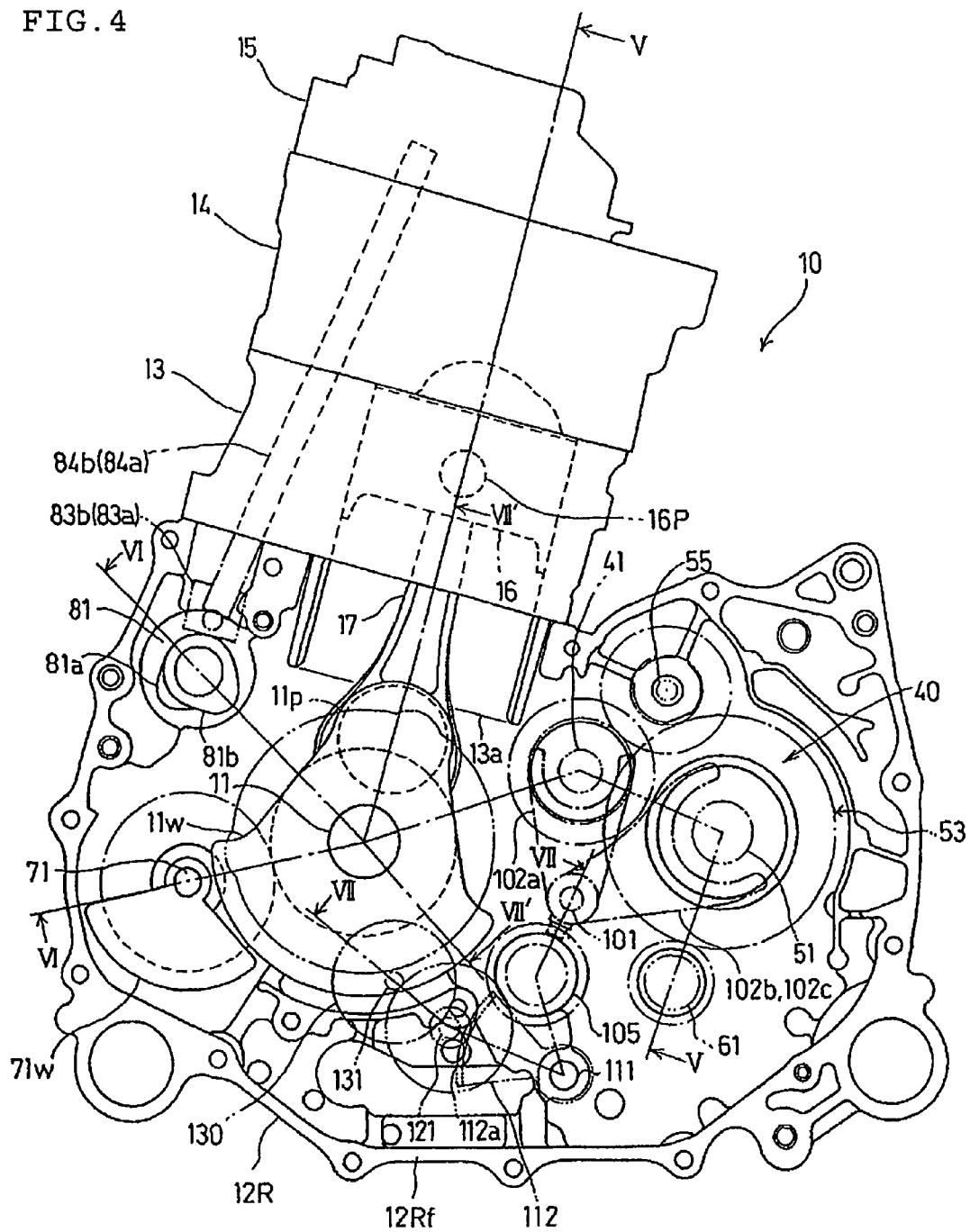
FIG. 4 is a front view of the rear crankcase half of the internal combustion engine of FIG. 1, in which the front crankcase half is omitted, showing the relative positions of the crankshaft, the main shaft, the countershaft, the output shaft, the shift spindle, the shift drum, and the shift motor.

FIG. 4 is a front view in which the front crankcase half 12F of the internal combustion engine 10 and others are omitted, and a joined face 12R of the rear crankcase half 12R is shown.

A cylinder sleeve 13a is fitted to the crankcase 12 from the cylinder block 13, and a piston 16 is fitted into the cylinder sleeve 13a so that the piston can reciprocate within the cylinder sleeve 13a. A connecting rod 17 couples a crankpin 11p, which is disposed between a pair of longitudinal crank webs 11w, 11w of the shaft 11, and a piston pin 16p provided on the piston 16.

Figure 5:
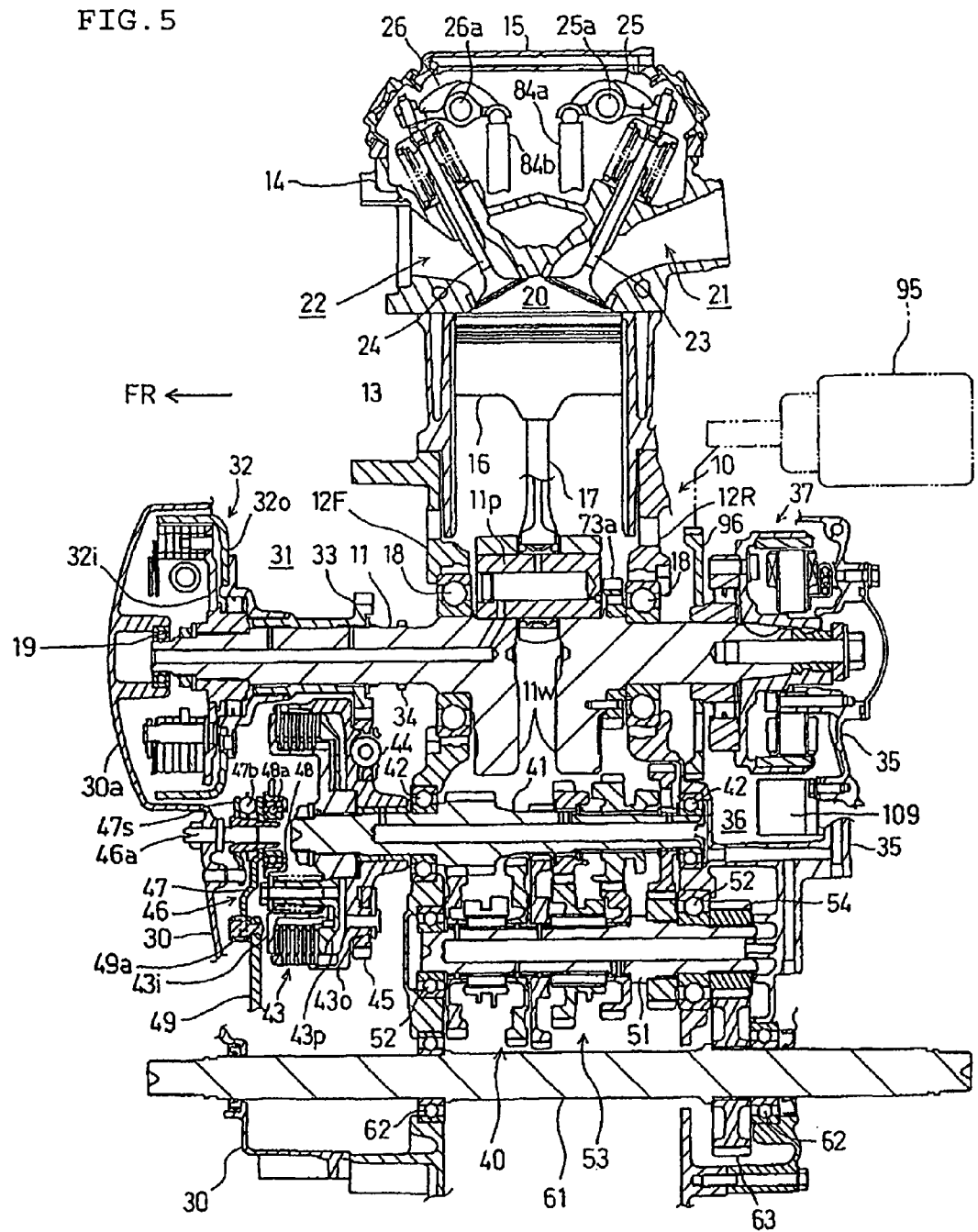
FIG. 5 is a sectional view viewed along a line V-V in FIG. 4.

As shown in FIG. 5, a combustion chamber 20 is formed between a top face of the piston 16 and a ceiling formed by the portion of the cylinder head 14 opposite to the piston, an intake port 21 extends rearward from the combustion chamber 20, and an exhaust port 22 extends forward. An intake valve 23 opens and closes an opening that opens to the combustion chamber 20 of the intake port 21, and an exhaust valve 24 opens and closes an opening that opens to the combustion chamber 20 of the exhaust port 22. Rocker arms 25, 26 that drive the intake valve 23 and the exhaust valve 24 are provided in the cylinder head cover 15 journaling to rocker arm shafts 25a, 26a.

The crankshaft 11 is journalled to the front crankcase 12F and the rear crankcase 12R via main bearings 18, 18 in front of and at the back of the crank webs 11w, 11w. A front cover 30, which is an engine case cover, covers the front crankcase half 12F from the front side and is connected to the front crankcase half, and a front housing 31 is formed between the front cover and the front crankcase half 12F.

The front end of the crankshaft 11 extends forward in the front housing 31 forward from the main bearing 18 held by the front crankcase half 12F, and is rotatably supported by the front cover 30 via bearings 19.

A starting clutch 32, which is a power transmission control device, is provided to the crankshaft 11 in the front housing 31 in the vicinity of the front end of the crankshaft. The starting clutch 32 is a centrifugal clutch, a clutch inner member 32i is fastened to the vicinity of the front end of the crankshaft 11, a clutch outer member 32o is supported by a primary driving gear 33 journalled to the crankshaft 11 via a one-way clutch in a state in which relative rotation in only one direction is allowed, and motive power is transmitted from the primary driving gear 33 to the transmission 40.

A driving sprocket 34 forming a transmission mechanism for a valve that rotates a cam shaft 81 described later is formed between the primary driving gear 33 of the crankshaft 11 and the main bearing 18.

The rear of the rear crankcase half 12R is covered with a rear cover 35, which is the engine case cover. A rear housing 36 is formed between the rear case half 12R and the rear cover 35, and an alternator 37 and other components are provided on the crankshaft 11 in the rear housing 36.

A main shaft 41 of the transmission 40 is arranged in parallel with the crankshaft 11, is positioned diagonally leftward and upward relative to the crankshaft 11 (see FIG. 4), and is rotatably journalled to the front crankcase 12F and the rear crankcase 12R via bearings 42, 42 (see FIG. 5).

A shift clutch 43 is provided at the front end (forward facing end) of the main shaft 41 so as to extend into the front housing 31 at a location forward from the bearing 42 held by the front crankcase half 12F.

The shift clutch 43 is a multiple disc friction clutch. A clutch inner member 43i is fastened to the front end of the main shaft 41, a clutch outer member 43o is rotatably journalled to the main shaft 41, and a pressure plate 43p is interposed between the clutch inner member 43i and the clutch outer member 43o. The pressure plate 43p presses or releases a stack of plural clutch discs integrally rotated with the clutch outer member 43o and plural friction discs integrally rotated with the clutch inner member 43i, whereby the transmission of motive power is controlled.

A clutch operating device 46 that operates the pressure plate 43p is arranged on the front side of the main shaft 41. As shown in FIG. 5, the clutch operating device 46 includes a variable cam plate lever 47 that is journalled to a supporting shaft 46a. Supporting shaft 46a is supported by the front cover 30 at a position in front of, and coaxially with, the main shaft 41 so that the variable cam plate lever can be turned and is axially slidable. The clutch operating device 46 also includes a ball 47b interposed between fixing plates 47s fastened to the supporting shaft 46a opposing and in front of the variable cam plate lever 47. When the variable cam plate lever 47 is rocked, the variable cam plate lever 47 is moved rearward by reaction force received from the fixing plate 47s via the ball 47b.

A coupling plate 48 is connected to the variable cam plate lever 47 via a bearing 48a, and is coupled to the pressure plate 43p of the shift clutch 43. The pressure plate 43p releases the stack of the friction discs upon the rearward movement of the variable cam plate lever 47, whereby the shift clutch 43 is let out (disengaged). A clutch arm 49 fastened to a shift spindle 111 described later operates the variable cam plate lever 47 and a roller 49a provided to an end of the clutch arm 49 is fitted into a groove at the end of the variable cam plate lever 47.

Since a primary driven gear 45 is provided on the clutch outer member 43o via a damper spring 44, and since the primary driving gear 33 and the primary driven gear 45 are engaged, the rotational motive power is transmitted to the clutch outer member 43o of the shift clutch 43 via the primary driven gear 45 and the damper spring 44 when the stating clutch 33 is let in (engaged) and the rotation of the crankshaft 11 is transmitted to the primary driving gear 33, and when the shift clutch 43 is let in, whereby the main shaft 41 is rotated together with the clutch inner member 43i.

The starting clutch 32 is located in front of the shift clutch 43, and is arranged close to the front of the shift clutch 43 so that the clutches 32, 43 are partially axially overlapped (in a front view). In addition, the longitudinal length of the crankshaft 11 may be shortened, distance between the crankshaft 11 and the main shaft 41 is also reduced, whereby the internal combustion engine 10 is miniaturized.

As seen in FIG. 4, a counter shaft 51 is arranged in parallel with the main shaft 41, and is positioned on the left side of; and diagonally below, the main shaft 41. Referring again to FIG. 5, the counter shaft 51 is rotatably journalled to the front crankcase half 12F and the rear crankcase half 12R via bearings 52, 52. A speed change gear train group 53, which is the gear train assembly that sets a level of speed, is formed between the main shaft 41 and the counter shaft 51. Gears are selectively engaged between the main shaft 41 and the counter shaft 51 during gear shifting.

A reverse shaft 55 is arranged in parallel with the main shaft 41, and is positioned on the left side of, and diagonally above, the main shaft 41. In addition, the output shaft 61 is arranged on the slight right side of, and below, the counter shaft 51 (see FIG. 4), and is rotatably journalled to the front crankcase 12F and the rear crankcase 12R via bearings 62, 62 (see FIG. 5).

A deceleration driving gear 54 is fitted on a rear end of the counter shaft 51 which protrudes rearward into the rear housing 36 from a crank chamber. A deceleration driven gear 63 is fitted on the output shaft 61, which arranged in parallel with the counter shaft 51. The deceleration driven gear 63 is engaged with the deceleration driving gear 54, whereby decelerated motive power is transmitted to the output shaft 61. The output shaft 61 extends longitudinally, pierces the front cover 30 and the rear cover 35, and protrudes outside. As described above, the rotation of the output shaft 61 at both longitudinal ends is respectively used for driving the front wheel FW and the rear wheel RW via the drive shafts 2F, 2R and others.

Figure 6:
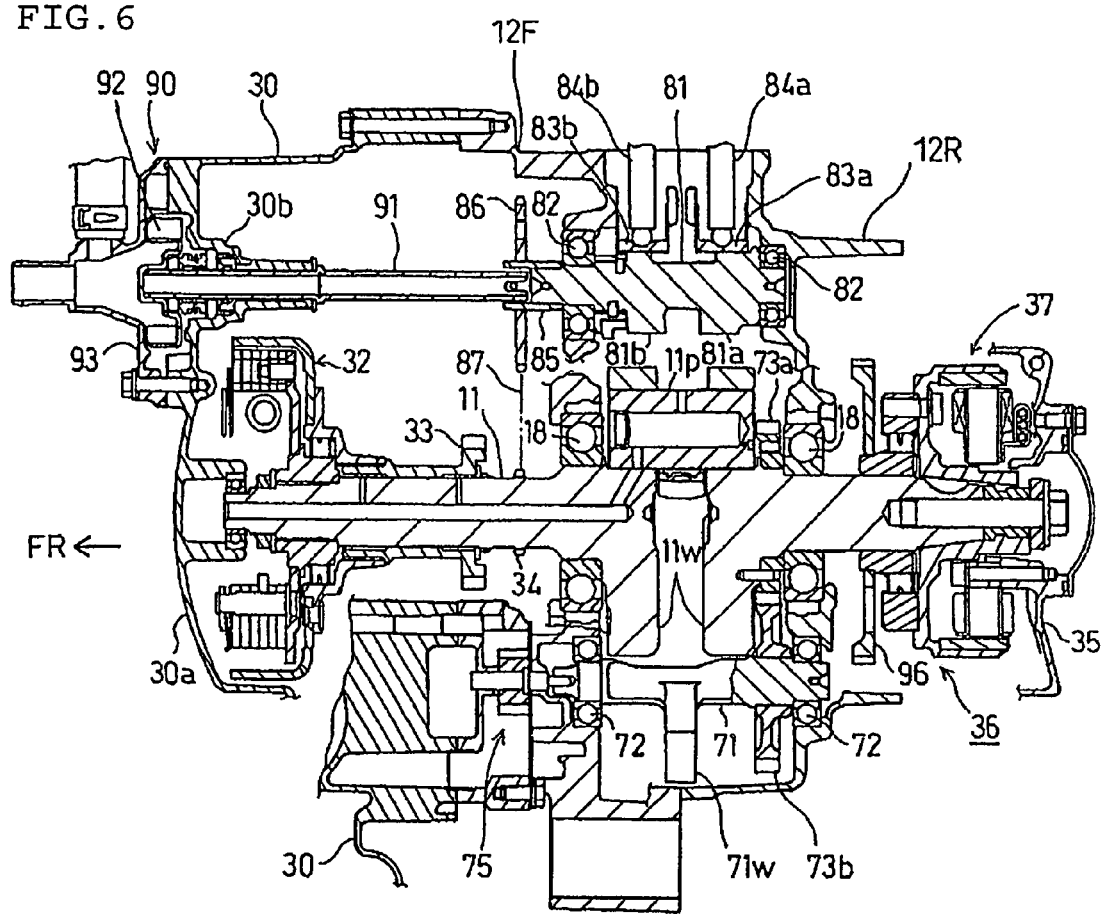
FIG. 6 is a sectional view viewed along a line VI-VI in FIG. 4.

A balance shaft 71 is arranged in parallel with the crankshaft 11, and is located on slightly below the right side (the left side in FIG. 4) of the crankshaft 11. As shown in FIG. 6, opposed ends of the balance shaft 71 are journalled respectively to the front crankcase 12F and the rear crankcase 12R via bearings 72, 72.

A balance weight 71w, formed in the center of the balance shaft 71, is located between the front and rear crank webs 11w, 11w of the crankshaft 11. A driven gear 73b is fitted on the rear of the balance shaft 71, and the driven gear is engaged with a driving gear 73a fitted on the crankshaft 11. In addition, an oil pump 75 is provided coaxially with, and in front of, the balance shaft 71.

A camshaft 81 of a valve system is arranged in parallel with the crankshaft 11, and is located above the right side of the crankshaft 11 (see FIG. 4). Respective opposed ends of the camshaft 81 are journalled to the front crankcase 12F and the rear crankcase 12R via bearings 82, 82 (see FIG. 6).

Cam followers 83a, 83b are vertically slidable, abut on cam lobes 81a, 81b of the camshaft 81, and receive respective lower ends of push rods 84a, 84b that transmit driving force to the rocker arms 25, 26 in the cylinder head cover 15.

As shown in FIG. 6, a coupling sleeve 85 is fitted to a front end of the crankshaft 81, which protrudes forward from the front crankcase 12F. The coupling sleeve 85 is provided with a driven sprocket 86, and a chain 87 (see a chain double-dashed line shown in FIG. 6) is wound between the driving sprocket 34 formed on the crankshaft 11 and the driven sprocket 86, whereby the rotation of the crankshaft 11 is transmitted to the crankshaft 81 via the chain 87.

A water pump 90 is provided on the front cover 30 in front of the camshaft 81. The water pump 90 is driven coaxially with the camshaft 81. The water pump 90 includes a water pump body 30b that connects with a clutch cover 30a covering the front of the starting clutch 32 of the front cover 30, a pump driving shaft 91 coupled to the camshaft 81 via the coupling sleeve 85 in front of the camshaft and integrally rotated with the camshaft is fitted into the water pump body 30b from its back, an impeller 92 which is fitted to the end protruded forward of the water pump body 30b, and a water pump cover 93 which covers the front of the impeller 92.

Figure 7:
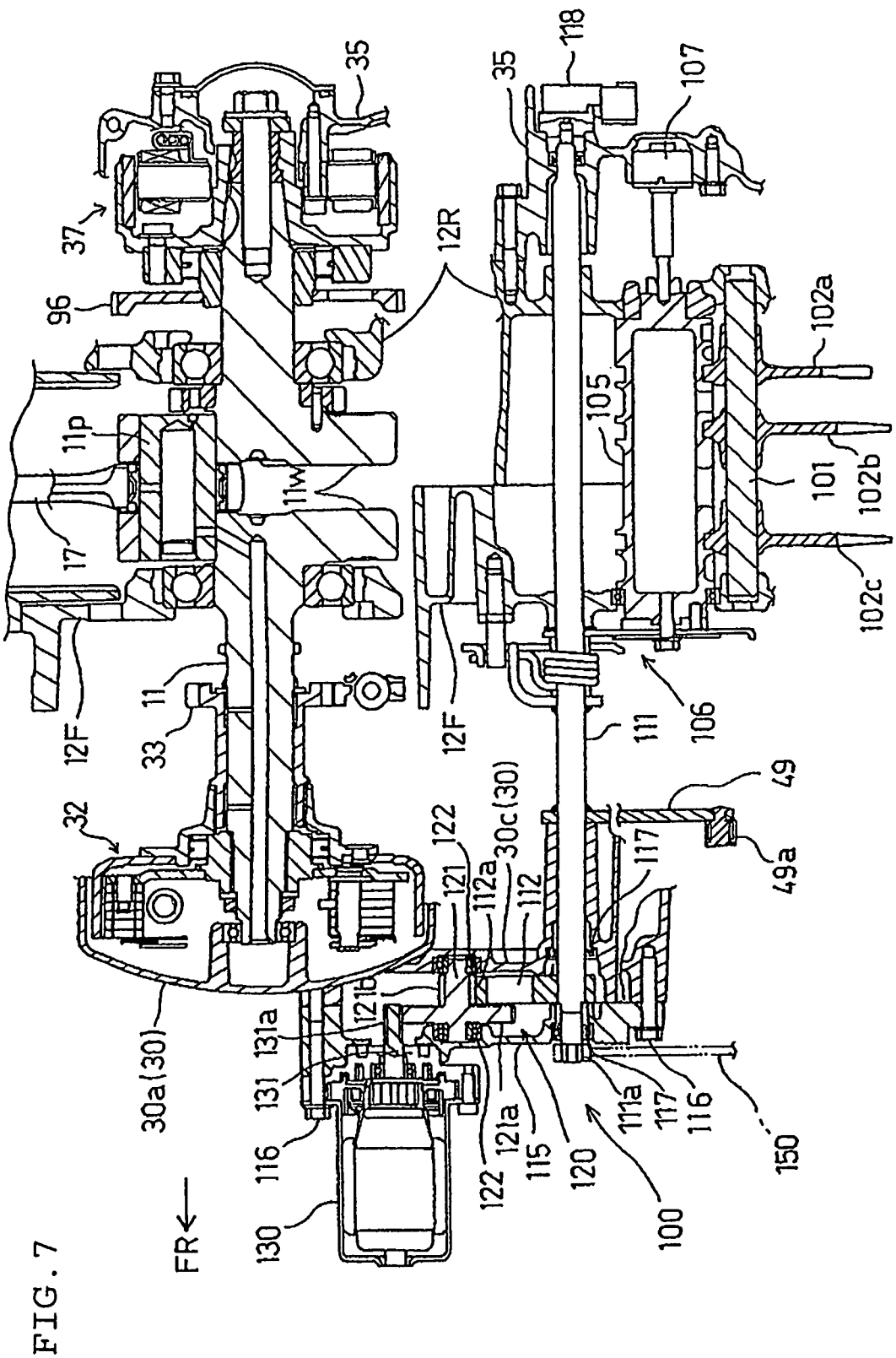
FIG. 7 is a synthesized sectional view viewed along a line VII-VII and a line VII-VII in FIG. 4.

A starter driven gear 96 is fitted in the rear of the rear housing 36 of the crankshaft 11 in front of the alternator 37 (see FIGS. 5, 6 and 7). The rotation of a drive shaft of a starting motor 95, which protrudes on an upper side the rear face of the rear crankcase 12R, is transmitted to the starter driven gear 96 via a speed reducing gear mechanism not shown, and the crankshaft 11 is forcedly rotated for starting.

A transmission driving mechanism 100 that drives the transmission 40 is provided below the crankshaft 11 and the main shaft 41. As shown in FIG. 4, a guide shaft 101 is arranged substantially under (in substantial vertical alignment with) the main shaft 41 so as to be at a slightly lower position than the crankshaft 11, and in parallel with the main shaft 41 and the counter shaft 51. Respective opposed ends of the guide shaft 101 are supported by the front crankcase 12F and the rear crankcase 12R (see FIG. 7), and a shift drum 105 is rotatably disposed between the front crankcase 12F and the rear crankcase 12R at a location further below the guide shaft 101.

As shown in FIG. 7, respective shift pins of shift forks 102a, 102b, 102c are slidably supported by the guide shaft 101, and are fitted into three shift grooves formed on the periphery of the shift drum 105. The shift fork 102a is guided into the corresponding shift groove by the turning of the shift drum 105, and is axially moved, and thus moves the gear on the main shaft 41. In addition, the shift forks 102b, 102c move the gears on the counter shaft 51, whereby a set of the engaged gears is changed, and a gear shift is accomplished.

The shift spindle 111, which is a shift spindle, is arranged below a left side of the shift drum 105, and is located in an opposed direction with respect to the shift drum 105 from a direction of an electric shift motor 130. The electric shift motor 130 is used to actuate gear shifting, and is arranged on the right side of the shift drum 105 when viewed from a rear axial end of the shift drum 105 (see FIG. 4). Thus, the shift spindle 111 is located at the lower end of the internal combustion engine 10 next to a lower edge of the crankcase 12. Moreover, as shown in FIG. 7, the shift spindle 111 is longitudinally long and pierces the front crankcase 12F, the rear crankcase 12R, further, the front cover 30 and the rear cover 35.

A shift transmission device 106 is interposed between the shift spindle 111 and the shift drum 105, and the turning of the shift spindle 111 turns the shift drum 105 via the shift transmission device 106 by a required angle. An angle at which the shift drum 105 is turned is sensed by a shift position sensor 107 that is coaxially provided at the rear side of the shift drum 105.

The base of the clutch arm 49 is integrally fastened to the shift spindle 111. The clutch arm 49 is integrally rocked by the turning of the shift spindle 111, rocks the variable cam plate lever 47 of the shift clutch 43 via the roller 49a at the end, whereby the shift clutch 43 can be let out as described above.

As shown in FIGS. 2 and 7, a gear case 30c is formed in the front of the front cover 30 extending from a lower part of the clutch cover 30a, covering the front of the starting clutch 32 of the front cover 30, to the shift spindle 111 on the diagonal downside of the left side (the right side in FIG. 2). A speed reducing gear mechanism 120 is arranged in the gear case 30c, and is covered with a gear cover 115 from the front side in the gear case 30c. The gear cover 115 is fastened to the gear case 30c of the front cover 30 by plural bolts 116.

A right upper half of the gear case 30c is equivalent to the front of the clutch cover 30a of the front cover 30, and the electric shift motor 130 is attached to the front of the right upper half of the gear cover 115 covering the front of the gear case 30c from the front side. A part of a bolt 116 out of the bolts 116 also fastens the electric shift motor 130 together with the gear cover 115.

A small-diameter driving gear 131a is formed at a rear end of a motor drive shaft 131 which protrudes rearward from the gear cover 115 of the electric shift motor 130.

The shift spindle 111 pierces the front cover 30 and the gear cover 115 via sealing material 117, 117 and a sectorial gear shift arm 112 is fitted onto the shift spindle 111 between the front cover 30 and the gear cover 115. A sectorial main part of the gear shift arm 112 is fitted onto the shift spindle 111, and a large-diameter sector gear 112a is formed in a peripheral circular-arc part of the gear shift arm 112.

As shown in FIG. 4, an idle gear shaft 121 is journalled to the front cover 30 and the gear cover 115 in a substantial intermediate position between the motor drive shaft 131 of the electric shift motor 130 and the shift spindle 111 so that both ends of the idle gear shaft 121 can be rotated via bearings 122, 122 (see FIG. 7). A large-diameter gear 121a and a small-diameter gear 121b are integrally longitudinally formed on the idle gear shaft 121. The large diameter gear 121a on the front side of the idle gear shaft 121 is engaged with the driving gear 131a of the motor drive shaft 131, and the small-diameter gear 121b on the rear side of the idle gear shaft 121 is engaged with the large-diameter gear 112a of the gear shift arm 112 of the shift spindle 111.

As described above, when the electric shift motor 130 is driven and the motor drive shaft 131 is rotated, the rotational speed of the motor drive shaft 131 is reduced via the idle gear shaft 121, and the rotational motive power is transmitted to the shift spindle 111.

Since the shift spindle 111 is arranged below the starting clutch 32 provided on the front end of the crankshaft 11, and the electric shift motor 130 protrudes in front from the lower part of the front cover 30 covering the front of the starting clutch 32, the electric shift motor 130 and the shift spindle 111 are located mutually close, and as described above, motive power can be easily and smoothly transmitted by the simple speed reducing gear mechanism 120 having one idle gear shaft 121.

The rotation of the shift spindle 111 lets out the shift clutch 43 via the clutch arm 49 and the clutch operating unit 46 as described above, simultaneously turns the shift drum 105 by the required angle via the shift transmission device 106, slides the shift forks 102a, 102b, 102c, changes a set of engaged gears of the speed change gear train group 53, whereby a gear shift of the transmission 40 is executed.

The speed reducing gear mechanism 120 of the transmission driving mechanism 100 is configured as described above, in which the idle gear shaft 121, which is apart of the speed reducing gear mechanism 120, and the electric shift motor 130 are located in front of the clutch cover 30a, that is, are arranged in positions overlapped with the axial outside of the starting clutch 32 as viewed from the front of the device.

As shown in FIG. 7, a turning angle sensor 118 is coaxially attached to a rear end of the shift spindle 111 at a location of the shift spindle 111 that pierces the rear cover 35. In addition, a hexagonal fitting part 111a is provided on the front end of the shift spindle 111 at a location of the shift spindle 111 that pierces the front cover 30 and the gear cover 115. The fitting part 111a protrudes forward, and is exposed outside.

The fitting part 111a, which is formed on the front end of the shift spindle 111 and protrudes outside, is located in front of the front cover 30 covering the respective fronts of the starting clutch 32 and the shift clutch 43 (see FIG. 7). The shift spindle 111 is turned using a turning tool such as a wrench 150. In particular, the shift spindle 111 is turned by fitting an operating part 150a of the wrench 150, which comprises a hexagonal hole, onto the hexagonal fitting part 111a, and then rotating the handle part of the wrench 150 about the longitudinal axis of the shift spindle 111 along the front of the front cover 30, whereby the shift of gears within the transmission 40 can be executed manually.

As shown in FIG. 1, the access opening 5a is formed as described above in the front of the side cover 5 of the all terrain vehicle 1, and manual shifting of gears within the transmission 40 can be executed by inserting the wrench 150 from the access opening 5a and fitting it to the fitting part 111a of the shift spindle 111 which protrudes in front of the internal combustion engine 10.

When the electric shift motor 130 fails, the all terrain vehicle 1 can be operated by manually setting the speed of the transmission 40 to first gear speed, for example, using the wrench 150 as described above.

As described above, in the transmission driving mechanism 100, the front end of the shift spindle 111 protrudes outside and as a result, and the fitting part 111a is merely formed thereon. Thus, a special transmission driving mechanism for manual shift is not required, the number of parts is reduced, the structure is simple and is excellent in the ease of assembly, no maintenance is required, and the cost can be reduced.

As shown in FIG. 2, the shift spindle 111 is adjacent to a lower edge of the front cover 30 (substantially a lower edge of the crankcase 12), is located below, and between, the electric shift motor 130 protruded in front of the front cover 30 and the output shaft 61. In addition, the operating part 150a at the lower end of the wrench 150 is fitted onto the fitting part 111a formed at the front end of the shift spindle 111, such that the handle part of the wrench 150 extends upward between the electric shift motor 130 and the output shaft 61. In order to rotate the shift spindle 111, the wrench 150 is rocked sideways along the front of the front cover 30, and its lateral turning limit position is shown by a chain double-dashed line in FIG. 2, and a sectorial area inside right and left turning limits is a turning range W.

As shown in FIG. 2, when a plane X including both the crankshaft 11 (a central axis of the starting clutch 32) and a central axis of the shift spindle 111 is defined, the electric shift motor 130 is arranged below the plane X, the main shaft 41 is arranged above the plane X such that the shift clutch 43 is above the plane X, is partially overlapped with the starting clutch 32 in the front view, and is located rearward of the starting clutch 32.

The tuning range W of the wrench 150 is along the front of the front cover 30 covering the respective fronts of the starting clutch 32 and the shift clutch 43, and is overlapped with a part of the front cover 30 on the upside where the shift clutch 43 is arranged with respect to the plane X in the front view. As a result, a large space in front of the starting clutch 32 and the shift clutch 43 respective having a large diameter can be used for the turning range W of the wrench 150, whereby the wrench 150 is lengthened, the operability thereof is enhanced, and work is extremely facilitated.

The shift position detector 107 is provided on a rear end of a rotating shaft of the shift drum 105, and the turning angle sensor 118 is attached to the rear end of the shift spindle 111, such that the shift position sensor 107 and the turning angle sensor 118 are arranged in the rear of the body of the internal combustion engine 10. As shown in FIG. 3, the alternator 37, the starting motor 95 and further, accessories such as a vehicle speed sensor 97 that senses vehicle speed based upon the rotation of the counter shaft 51 are arranged in the rear of the body of the internal combustion engine 10.

A crankshaft rotation counting sensor 109 that senses the number of revolutions of the crankshaft 11 based upon the rotation of the outer member of the alternator 37 is attached to the rear cover 35 (see FIG. 3), and an engine speed sensor (not shown) that senses engine speed based upon the rotation of the deceleration driving gear 54 fitted onto the rear end of the counter shaft 51 is attached to the rear cover 35.

Further, a terminal 108 of the shift position sensor 107 protrudes on the right side of the vehicle speed sensor 97, a distribution cord 99a of the alternator extends from the upside of the alternator 37, and an AC generator terminal 99 is provided on the end.

Since these accessories are arranged in the rear of the body of the internal combustion engine 10, space is produced in front of the body of the internal combustion engine 10 and as a result, the turning range W of the wrench 150 is sufficiently secured.

In addition, since the accessories are concentrated on the rear of the body of the internal combustion engine 10, a signal line and a power line respectively extending from these accessories can be collectively wired. Further, since the accessories are arranged in the rear of the body of the internal combustion engine 10, the accessories can be protected from a scattering stone and others impacts.

While a working example of the present invention has been described above, the present invention is not limited to the working example described above, but various design alterations may be carried out without departing from the present invention as set forth in the claims.

What is claimed is:

1. An internal combustion engine including an engine case, an engine case cover, a crankshaft disposed within the engine case, an output shaft, and a transmission disposed within the engine case,
   the transmission configured to transmit rotation of the crankshaft of the output shaft at a modified speed,
   the transmission comprising:
   a plurality of speed change gears which are selectively combinable, a selected combination of gears determining an output speed of the engine, and
   a transmission driving mechanism which is operable to shift gears within the transmission to obtain a desired selected combination of gears, the transmission driving mechanism comprising:
   a shift spindle rotatably supported on the engine case such that a first end of the shift spindle extends through the engine case cover and protrudes outside the engine case cover, the shift spindle operably connected to the gears such that rotating the shift spindle changes the selected combination of gears,
   a turning angle sensor operatively attached to a second end of the shift spindle,
   a shift actuator operably connected to the first end of the shift spindle to drive rotation of the shift spindle,
   a fitting part formed at the protruding first end of the shift spindle and configured to receive a working end of a manual turning tool fitted thereon,
   wherein:
   the engine is configured and arranged such that a clearance is provided adjacent the protruding first end of the shift spindle;
   the fitting part is substantially unobstructed and accessible for selective engagement with the manual turning tool while maintaining the operable connection of the shift actuator; and
   the clearance allows for an unobstructed turning range of the manual turning tool.

2. The internal combustion engine of claim 1, wherein the internal combustion engine is mounted in a vehicle such that the crankshaft is directed in a longitudinal direction of a body of the vehicle,
   the shift spindle is arranged in parallel to the crankshaft and is directed in the longitudinal direction of the vehicle body,
   the fitting part is formed at the front end of the shift spindle, the front being relative to the direction of forward motion of the vehicle, and
   a front of the engine case is configured to permit turning of a manual turning tool along the front thereof when the manual turning tool is fitted on the fitting part.

3. The internal combustion engine of claim 2, the transmission driving mechanism further comprising a turning angle sensing device disposed on a rear end of the shift spindle, the rear being relative to the direction of forward motion of the vehicle, and
   wherein the engine further comprises an alternator, a starting motor, and a vehicle speed sensor, and wherein the alternator, the starting motor and the vehicle speed sensor are arranged on a rear side of the engine.

4. The internal combustion engine of claim 2, wherein
   the internal combustion engine further comprises a starting clutch disposed on a front end of the crankshaft and an engine case cover covering at least the front of the starting clutch,
   the shift spindle is arranged below the starting clutch,
   the shift actuator protrudes forward in a lower part of the engine case cover covering the front of the starting clutch, and
   the front of the engine case is configured to permit turning of the manual turning tool along the front thereof over a turning range of the turning tool such that the turning range of the turning tool overlaps with the starting clutch on the side of the shift actuator of the engine case cover in a front view.

5. The internal combustion engine according to claim 4, wherein the transmission further includes a shift clutch, and wherein
   a plane is defined which includes both a central axis of the starting clutch and a central axis of the shift spindle,
   the shift actuator is arranged on one side of the plane,
   the shift clutch is arranged on the other side of the plane so that the shift clutch partially overlaps with the starting clutch, and is disposed rearward of the starting clutch as seen in the front view of the engine,
   the engine case cover also covers the front of the shift clutch together with the front of the starting clutch, and
   the front of the engine case is configured to permit turning of the manual turning tool along the front thereof such that the turning range of the turning tool overlaps with the shift clutch in the front view.

6. The internal combustion engine according to claim 4, wherein the shift spindle is arranged next to a lower edge of the engine case.

7. In a vehicle having a body and a body covering, the improvement comprising an internal combustion engine including an engine case, an engine case cover, a crankshaft disposed within the engine case, an output shaft, and a transmission disposed within the engine case, wherein the body covering has an access opening formed therein to permit access to a front portion of the engine, the transmission configured to transmit the rotation of the crankshaft of the internal combustion engine to the output shaft at a modified speed, the transmission comprising:

a plurality of speed change gears which are selectively combinable, a selected combination of gears determining an output speed of the engine, a transmission driving mechanism which is operable to shift gears within the transmission to obtain a desired selected combination of gears, the transmission driving mechanism comprising:

a shift spindle rotatably supported on the engine case such that a first end of the shift spindle extends through the engine case cover and protrudes outside the engine case cover, the shift spindle operably connected to the gears such that rotating the shift spindle changes the selected combination of gears, a turning angle sensor operatively attached to a second end of the shift spindle, a shift actuator operably connected to the first end of the shift spindle to drive rotation of the shift spindle, the shift actuator comprising an electric motor, and a fitting part formed at the protruded first end of the shift spindle and configured to receive a working end of a manual turning tool fitted thereon, wherein:

the engine is configured and arranged such that a clearance is provided adjacent the protruding first end of the shift spindle;

the fitting part is substantially unobstructed and accessible for selective engagement with the manual turning tool while maintaining the operable connection of the shift actuator;

the clearance allows for an unobstructed turning range of the manual turning tool; and an end of the manual turning tool extends through the access opening of the body covering, when the manual turning tool is engaged with the fitting part, for use by a vehicle operator to manually actuate the shift spindle.

8. The internal combustion engine of claim 7, wherein internal combustion engine is mounted in a vehicle such that the crankshaft is directed in a longitudinal direction of a body of the vehicle, the shift spindle is arranged in parallel to the crankshaft and is directed in the longitudinal direction of the vehicle body, the fitting part is formed at the front end of the shift spindle, the front end being relative to the direction of forward motion of the vehicle, and a front of the engine case is configured to permit turning of the handle portion of the manual turning tool along the front thereof when the manual turning tool is fitted on the fitting part.

9. The internal combustion engine of claim 8, the transmission driving mechanism further comprising a turning angle sensing device disposed on a rear end of the shift spindle, the rear end being relative to the direction of forward motion of the vehicle, and wherein accessories of the internal combustion engine are arranged mainly in a rear of a body of the internal combustion engine.

10. The internal combustion engine of claim 9, wherein the internal combustion engine further comprises a starting clutch disposed on a front end of the crankshaft and an engine case cover covering at least the front of the starting clutch, the shift spindle is arranged below the starting clutch, the shift actuator protrudes forward in a lower part of the engine case cover covering the front of the starting clutch, and a turning range of the handle portion of the turning tool overlaps with the starting clutch on the side of the shift actuator of the engine case cover in a front view.

11. The internal combustion engine according to claim 10, wherein the transmission further includes a shift clutch, and wherein a plane is defined which includes both a central axis of the starting clutch and a central axis of the shift spindle, the shift actuator is arranged on one side of the plane, the shift clutch is arranged on the other side of the plane so that the shift clutch partially overlaps with the starting clutch, and is disposed rearward of the starting clutch as seen in the front view of the engine, the engine case cover also covers the front of the shift clutch together with the front of the starting clutch, and the turning range of the handle portion of the turning tool overlaps with the shift clutch in the front view.

12. The internal combustion engine according to claim 10, wherein the shift spindle is arranged next to a lower edge of the engine case.

13. The internal combustion engine according to claim 7, wherein the fitting part is a standardized hexagonal element configured such that the manual turning tool is a complimentary hex wrench.

14. The internal combustion engine according to claim 1, wherein the fitting part is a standardized hexagonal element configured such that the manual turning tool is a complimentary hex wrench.

* * * * *